United States Patent [19]

Marlow et al.

[11] Patent Number: 4,723,123
[45] Date of Patent: Feb. 2, 1988

[54] RADAR SYSTEM

[76] Inventors: Raymond Marlow, Rt. 4, #6 Eastshore Rd., Rockwall, Tex. 75087; John L. Nelson, Jr., 2408 Scorpius, Garland, Tex. 75042

[21] Appl. No.: 727,761

[22] Filed: Apr. 26, 1985

[51] Int. Cl.$^4$ .................... G01S 13/72; H01Q 15/14
[52] U.S. Cl. .................................. 342/6; 342/33; 342/109
[58] Field of Search .............. 343/5 LS, 18 D; 342/6, 342/33, 109

[56] References Cited

U.S. PATENT DOCUMENTS

| | | | |
|---|---|---|---|
| 3,158,862 | 11/1964 | Chisholm | 343/18 D |
| 3,243,816 | 3/1966 | Chisholm | 343/18 D |
| 3,295,132 | 12/1966 | Chapman, Jr. | 343/18 D |
| 3,703,723 | 11/1972 | Albanese et al. | 343/18 D |
| 3,716,855 | 2/1973 | Asam | 343/5 LS |
| 3,908,189 | 9/1975 | Buehler et al. | 343/18 D X |
| 4,031,535 | 6/1977 | Isbister | 342/6 X |
| 4,043,194 | 8/1977 | Tanner | 342/26 X |
| 4,103,300 | 7/1978 | Gendreu et al. | 343/5 LS X |
| 4,283,725 | 8/1981 | Chisholm | 343/5 LS X |
| 4,594,676 | 6/1986 | Breiholz et al. | 342/109 X |

Primary Examiner—T. H. Tubbesing
Attorney, Agent, or Firm—A. H. Bandy

[57] ABSTRACT

A radar system comprising an RF transmitter and receiver means for mounting in a moving carrier for transmitting RF energy and receiving RF energy returns and a non-rotating modulating radar reflector which has a lens means for focusing incident impinging RF energy onto a spot opposite the incident side and a plurality of solid state modulating radar reflectors positioned at the spot locations for selectively reflecting the RF energy and dissipating the RF energy for providing RF energy returns modulated with a lens identification code and frequencies for determining true ground speed, range, glide slope, and azimuth position. The solid state modulating radar reflector including a microwave section having open back and front ends, a load resistive means at the back end, a PIN diode adjacent to the load resistive means and a modulating power source for modulating the PIN diode to provide at preselected intervals virtual shorts at the open end of the wave guide for reflecting modulated RF energy returns directly to the source of RF energy.

3 Claims, 22 Drawing Figures

ONE REVOLUTION

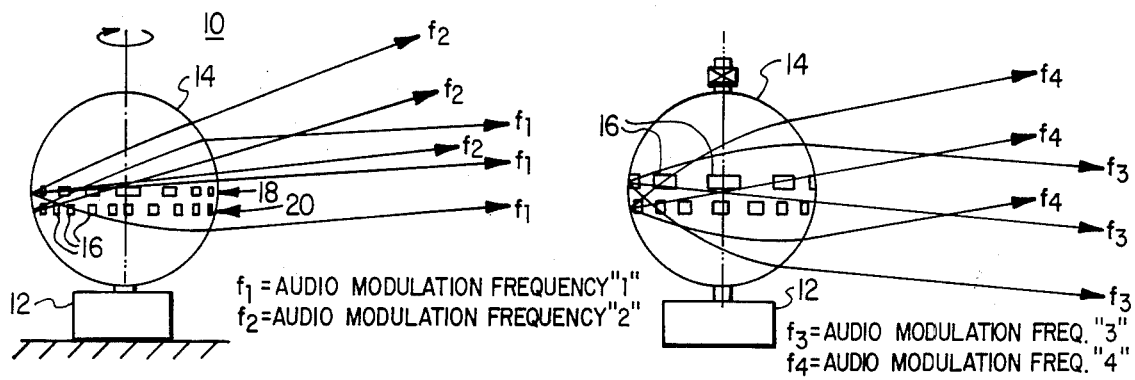
FIG. 3a (PRIOR ART)
FIG. 3b (PRIOR ART)
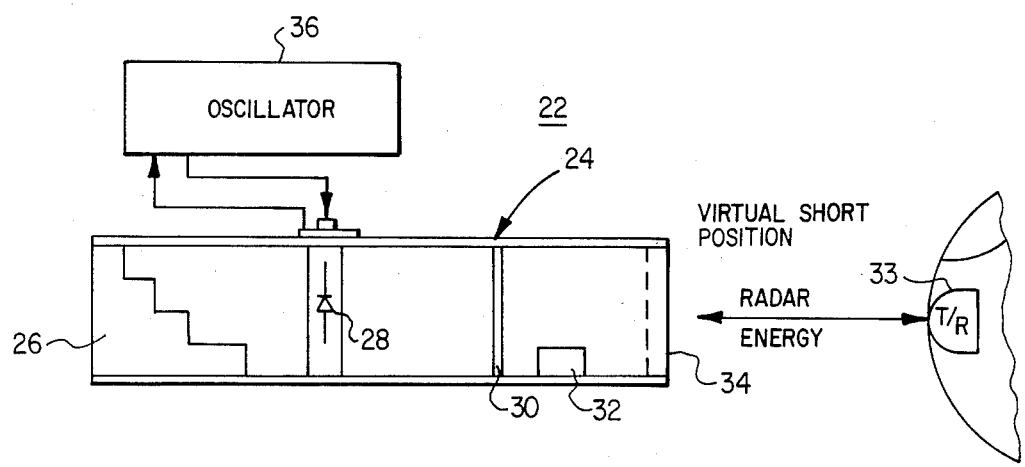
FIG. 4
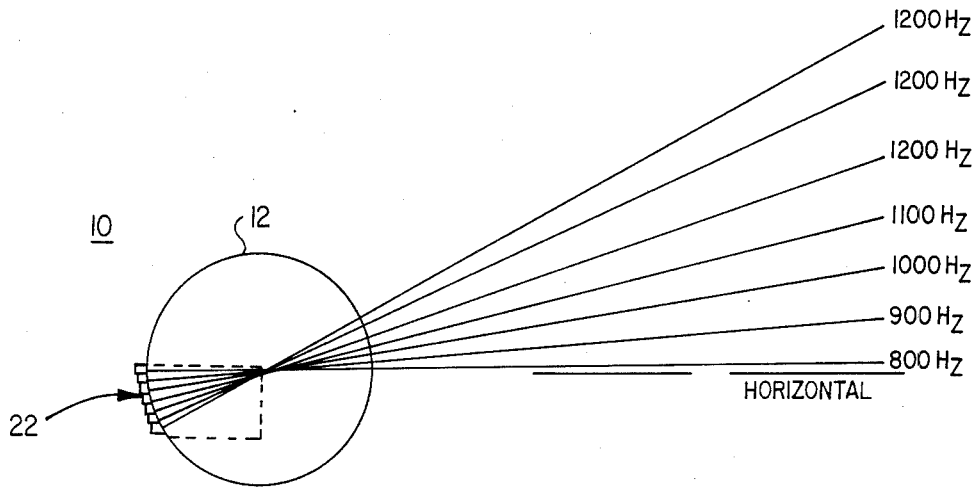
FIG. 5a

RADAR SYSTEM

This invention relates to radars and more particularly to an electronically modulated electromagnetic wave system.

In the past, "wind shear" has been a cause of accidents for aircraft taking off or landing at an airport. The Federal Aviation Administration has determined that the best way to detect and to avoid wind shear is to accurately measure aircraft ground speed and appropriately compare it to air speed. Air shear is the result of down drafts which form vertical columns of air descending close to ground where they split into headwinds and tailwinds along the approach path to the airport causing substantial increases in air velocities for a small distance (10–20 miles) in each direction before dispersion or return to normal air velocities. Because so many factors influence air speed in landing operations, an increase in air speed is not a positive identification of wind shear; however, a sudden decrease in ground speed resulting from the increased headwind is indicative of wind shear ahead and the speed required to prevent stalling or the aircraft when it encounters the down draft and tailwind on the other side of the down draft. Ground speed is determined by radar as functions of differences in ranges and time. One successfully demonstrated means of measuring ground speed used an airborne weather radar and modulating reflector on the ground. Another accurate way to detect wind shear is to use an inertial navigation system in each aircraft to measure ground speed. The major disadvantage of the latter solution is the cost ($500,000 to $800,000) of a satisfactory inertial navigation system.

The use of ground mapping radars, weather radars or terrain avoidance radars has been considered. However, their target detecting capability presents a major problem. There are multitudes of targets, constantly changing in reflectivity in a random manner, each returning different range information. Nevertheless, radar can be made extremely accurate in measuring range, if it has a discrete target to use.

In an attempt to provide such a target, a passive, non-radiating, modulating radar reflector was developed (U.S. Pat. No. 3,295,132 issued Dec. 27, 1966). The modulating radar reflector produces a known FM frequency which can be locked onto by the airborne radar. All other targets can be ignored as long as the signal to clutter ratio is reasonable.

The modulating radar reflector or Luneberg lens as it is referred to in common parlance provides the basis for a wind shear avoidance device as well as a landing system. However, as the Luneberg lens has to be mechanically rotated, problems related to reliability and cold weather operations were anticipated. In fact, the required construction of a practical Luneberg lens involved the use of a foam plastic; this material severely limited its maximum modulation frequency. When a foam plastic material was used for a 30" diameter Luneberg lens, the lens self destructed at a rotational speed of about 600 RPM owing to the centrifugal force. The centrifugal force distorted the lens.

Accordingly, it is an object of this invention to provide a means for modulating a Luneberg lens as well as other types of electromagnetic wave reflectors without rotation.

Another object of the invention is to provide a practical wind shear detection system which utilizes accurately measured ground speed for comparison with the air speed of the aircraft.

Yet another object of the invention is to provide a practical wind shear detection system which can also be utilized as an aircraft landing system.

Still another object of the invention is to provide a modulating radar reflector having no mechanically moving parts and which is capable of data rates substantially increased compared to a rotating lens.

A further object of the invention is to provide a modulating radar reflector capable of producing more flexible data rates.

Yet a further object of the invention is to provide a wind shear detection system which can also provide precision localizer (azimuth) and descent path (glide slope or elevation angle) guidance for an aircraft.

Still a further object of the invention is to provide a wind shear detection and landing system capable of being used for either manual control of the aircraft or of being coupled to an automatic landing system.

Still yet another object of the invention is to provide a wind shear system for providing in a time shared basis a system for information pertaining to range, range-rate/ground speed, positive ground unit identification, verifying the control of the landing gear braking friction and measuring take-off acceleration.

Briefly stated, this invention comprises a radar landing system including an interrogator transmitter/receiver, the transmitter of which is for transmitting RF energy to a solid state modulating reflector or solid state Luneberg lens, utilizing PIN diodes as the means for modulating reflected radar energy back along the transmission path to the receiver of the interrogator transmitter/receiver. The modulation of the reflected radar energy is accomplished by controlling the current in the PIN diode. A controller is used aboard the aircraft to derive ground speed along the approach path where a decrease in ground speed is indicative of wind shear conditions between the aircraft and the modulating reflector.

Other objects and features of the inventions will become more readily aparent from the following description of the invention when read in conjunction with the drawings in which:

FIGS. 3a and 3b are views showing the use of the prior art Luneberg lens used to establish a descent path and as a localizer;

FIG. 4 is a view partly in cross-section of the solid state modulating radar reflector module;

FIGS. 5a and 5b are side and top views of an array of waveguide modules performing as a glide slope function;

Figure 1:
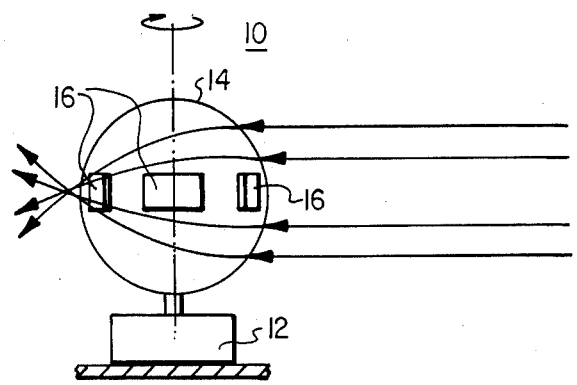
FIG. 1 is a view of a prior art Luneberg lens.
Figure 1A:
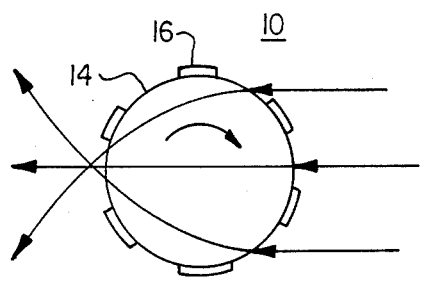
FIGS. 1a and 1b are top views of the prior art Luneberg lens operating resepctively as an electromagnetic energy absorber and reflector.
Figure 1B:
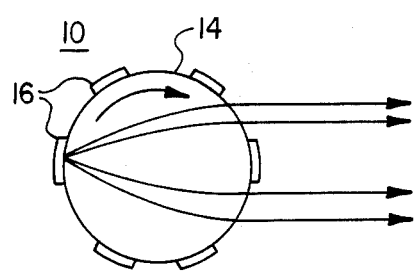

Referring now to FIG. 1, a Luneberg lens 10 is rotated by motor 12 at a constant rate of speed. The lens 10 focuses incoming RF energy received from an airborne interrogation transmitter of an interrogator transmitter/receiver to a small spot on the spherical surface 14 of the lens opposite the side where the radar waves entered. If no reflecting surface 16 is present where the spot is formed (FIG. 1a), the radar energy passes through the surface, is dissipated, and none of the focused radar signal is returned to the radar transmitting vehicle. If a radar reflective element 16, for example, a piece of aluminum foil, is present at the radar spot (FIG. 1b), the radar signal is reflected precisely back in a very sharp beam along the path from whence it came.

Figure 2A:
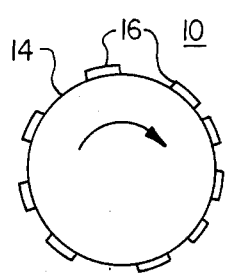
FIGS. 2a and 2b are top and side views of the prior art Luneberg lens operating as a coded reflector.
Figure 2B:
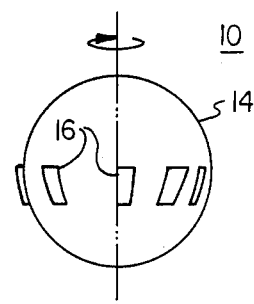
Figure 2C:
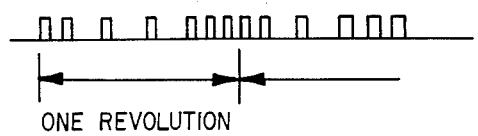
FIG. 2c is a chart of the coded output of the Luneberg reflector of FIGS. 2a and 2b.

The Luneberg lens 10 (FIG. 2a) uses alternate reflecting and non-reflecting strips on patches 16 on the surface 14 and is mechanically rotated to chop or amplitude modulate the incoming radar signals in order that the reflected radar energy is at an audio frequency (FIG. 2c). At a fixed rotational speed, the audio frequency is proportional to the number of reflective patches (6 used) (FIGS. 2a and 2b). The Luneberg lens 10 as shown in FIG. 2b has its patches 14 spaced to produce a digitally coded word (FIG. 2c) which permits positive identification of the facility at which it is located. For example, with a 15 inch radius lens, more than 4000 individual codes are available for identification purposes.

Referring now to FIG. 3a, in which is shown the Luneberg lens 10 with two horizontal rows 18 and 20 of patches 16 for establishing a descent path. It will be noted that each row 16 and 18 has a different number of reflective patches for producing different audio frequencies at different elevation angles. It will be appreciated that the focused spot has a definite size depending on the frequency of the radar used. At X-band the spot is about 1 inch in diameter. Thus, if the vertical height of the reflective patches 16 is properly sized, as the spot moves when the elevation angle of the incoming energy is changed, thee is a smooth transition of the percentage of mix of the two audio frequencies, f and $f_2$ in the return signals. The linearity of this mixing action is such that with the 15 inch radius lens, a precision of about 0.015 degrees of elevation angle is attainable.

In a Luneberg lens 10 the modulating frequencies in space establishes a conical (360°) descent path pattern.

Referring now to FIG. 3b, if another Luneberg lens 10 is mounted for rotation with its spin axes horizontal and uses an arrangement of patches 10 different from those used on the elevation lens, a localizer (azimuth) pattern is produced.

To alleviate the problems attending the use of a rotating Luneberg lens, the solid state modulating radar module reflectors 22 (FIG. 4) are used in place of the aluminum foil reflector patches 16 and the lens is not rotated.

Each solid state modulating radar module reflector 22 (FIG. 4) comprises a short piece of cast or molded conductive plastic waveguide 24 having an RF resistive load 26 at its rear end. A PIN diode 28 is positioned in front of the RF resistive load 26. Next, a corrective capacitive element 30 is positioned in front of the PIN diode 26 and a stub 32 is positioned in front of the capacitive correcting element 30 for inductance correction.

The PIN diode 28 is so positioned within the waveguide 24 that when a current passes through the diode it reflects a short (reflects radar energy received from a transmitter of airborne transmitter/receiver 33) just inside the front aperture 34 of the waveguide (virtual short position). When no current passes through the diode 28 it makes the waveguide appear as an energy absorber.

An oscillator 36 is connected to the PIN diode or controlling the current in the PIN diode. This operation of the PIN diode provides the desired identification code (frequency) for the element.

Excellent coupling to the open end of waveguide 22 is achieved by adjusting the capacitive element 30 and inductive stub 32. Reflective energy of 95 to 97% should be achievable with properly designed fixed impedance matches.

It will be appreciated that if the rear end of the wave guide is left open the radar energy received from the interrogator transmitter for the interrogator transmitter/receiver 33 is spilled out into space behind the lens and is dissipated. To match the energy reflected back to the receiver of the interrogator transmitter/receiver, a proper impedance match is required at this end. The RF resistance load 26 makes the front end of the waveguide 24 look non-reflective when no current flows through the PIN diode 28.

Figure 5B:
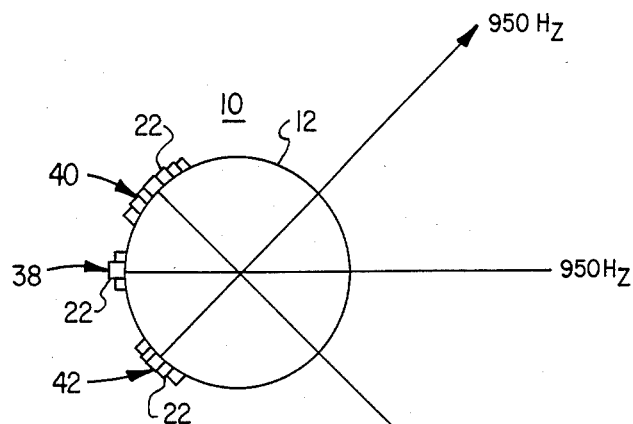

A production design with fixed impedance matching and a molded RF resistance load results in a very high amplitude modulation percentage in a single element. Referring now to FIGS. 5a and 5b, in which a glide slope arrangement is shown, the lens 10 has three columns of seven vertically stacked modulating radar module reflectors 22 (FIGS. 5a) located at spots for generating frequencies of, for example, 800 Hz, 900 Hz, 1000 Hz, 1100 Hz, 1200 Hz, 1200 Hz, and 1200 Hz, respectively, from the horizontal. The columns are provided with varying numbers of horizontally positioned reflectors 22 (FIG. 5b) to provide a digitally modulated microwave reflector as follows: at the center column 38, seven rows of three reflectors 22 each; to the left of center, seven rows 40 of six reflectors each; and to the right of center, seven rows 42 of 5 five reflectors each. Each column as shown transmits for example at a 950 Hz frequency.

Figures 6A, 6B:
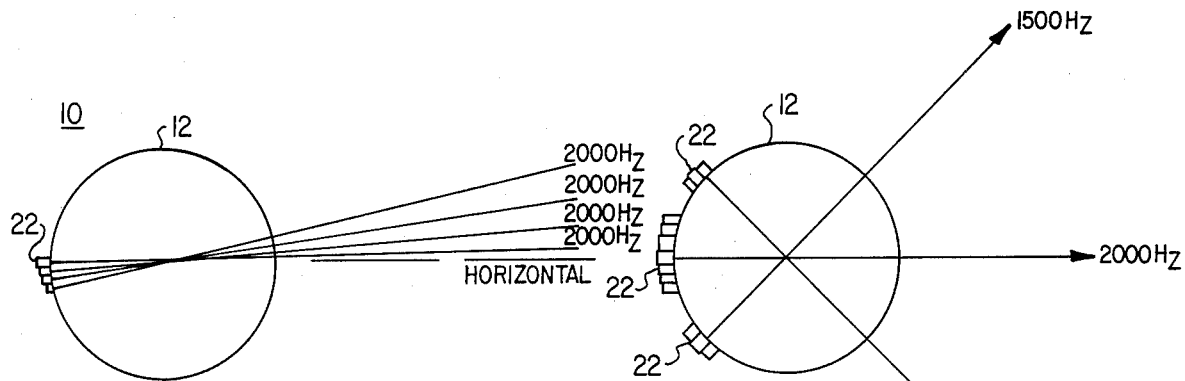
FIGS. 6a and 6b are side and top views of an array of waveguide modules performing as a localizer (azimuth)

The same configuration but with vertical columns activated att he same time but operating at a different frequency (e.g. 1500 to 2500 Hz) across the array in azimuth (localizer) is shown in FIGS. 6a and 6b. The frequency does not vary with the elevation angle (FIG. 6a), but does vary as the azimuth angle is changed. This is now performing as did the spinning Luneberg lens used as a localizer.

The localizer and the glide slope generator can be co-located where superposition of the modulation can be used and one lens/array assembly can perform both glide slope and localizer functions.

Figure 7A:
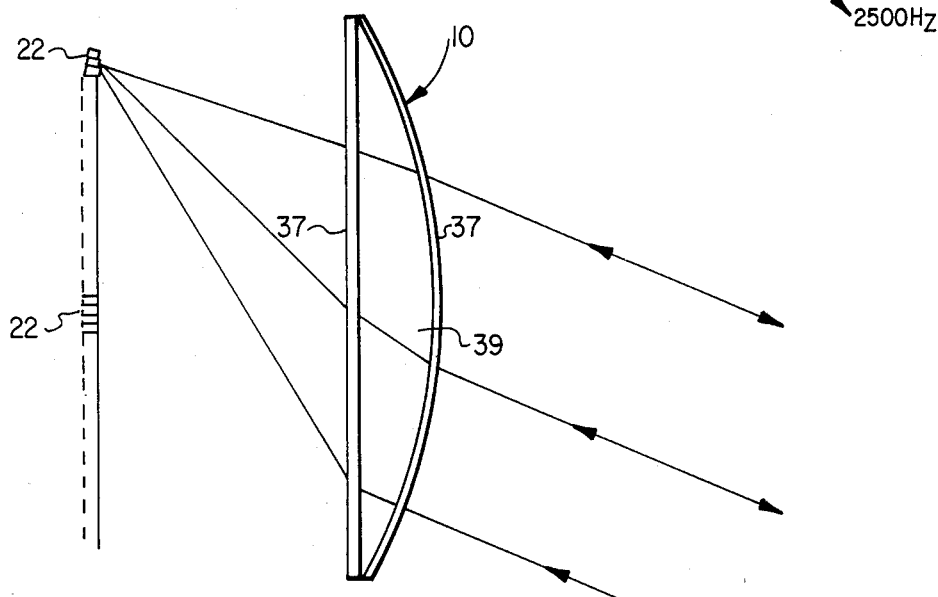
FIGS. 7a and 7b are views of second and third embodiments of the digitally modulated microwave reflector of the invention.
Figure 7B:
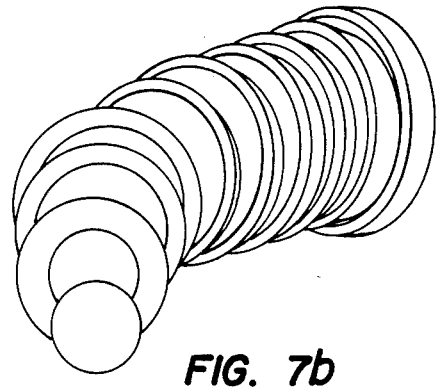

In a second embodiment (FIG. 7a), the lens 10 is a simple design with aspheric connections that can be produced from a homogeneous foam block 39 turned on a lathe. The air-to lens anti-reflective coating 37 is comparable to that used in conventional coated optics. The modulated microwave modules 22 are positioned in a line but at preselected angles with respect to the horizontal (reference line) to provide the desired angular coverage. Alternatively, in a third embodiment a spherical lens (FIG. 7b) having multi-shell lens can be used for focusing the received RF energy.

Figure 8:
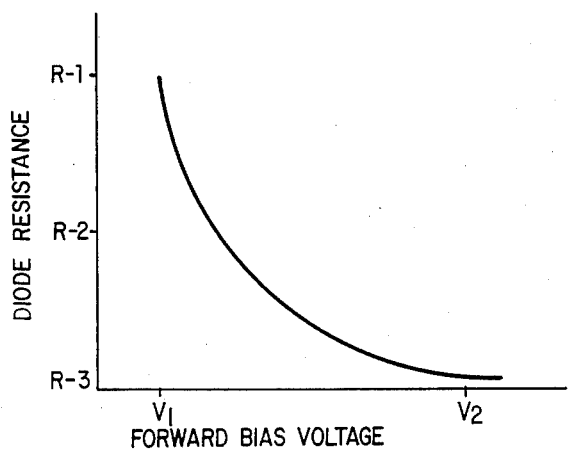
FIG. 8 is a diagram of Diode Resistance versus forward bias voltage.
Figure 9:
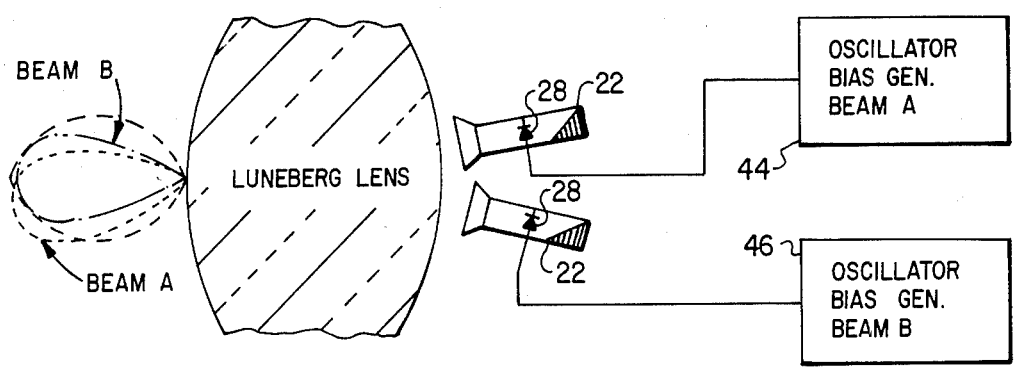
FIG. 9 is a view showing beam identification and reflection.
Figure 10:
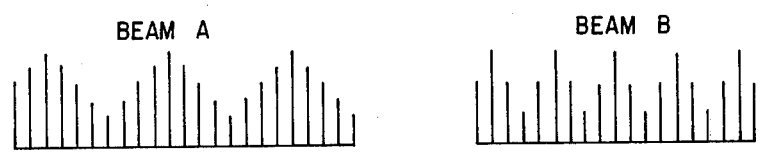
FIG. 10 is a view showing the audio (frequency) modulation of the radar pulse train.

A diode resistance versus bias voltage curve is shown in FIG. 8. When bias voltage of oscillator 44 is applied to the PIN diode 28 (FIG. 9) of diode modulated waveguide reflector 22, a coded beam A (FIG. 10) is reflected back to the radar transmitter/receiver, and when bias voltage of oscillator 46 is applied to the PIN diode 28' of reflector 22', beam B is reflected back to the radar transmitter/receiver.

Figure 11:
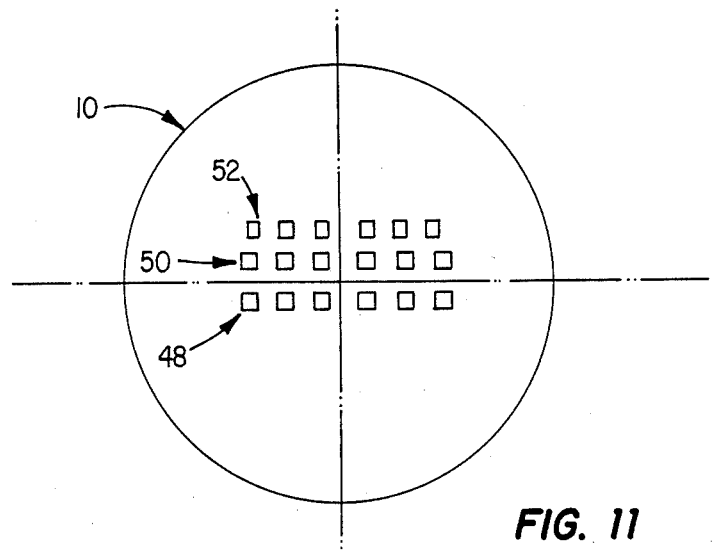
FIG. 11 is a rear view of an eighteen modulated reflector configuration.
Figure 12:
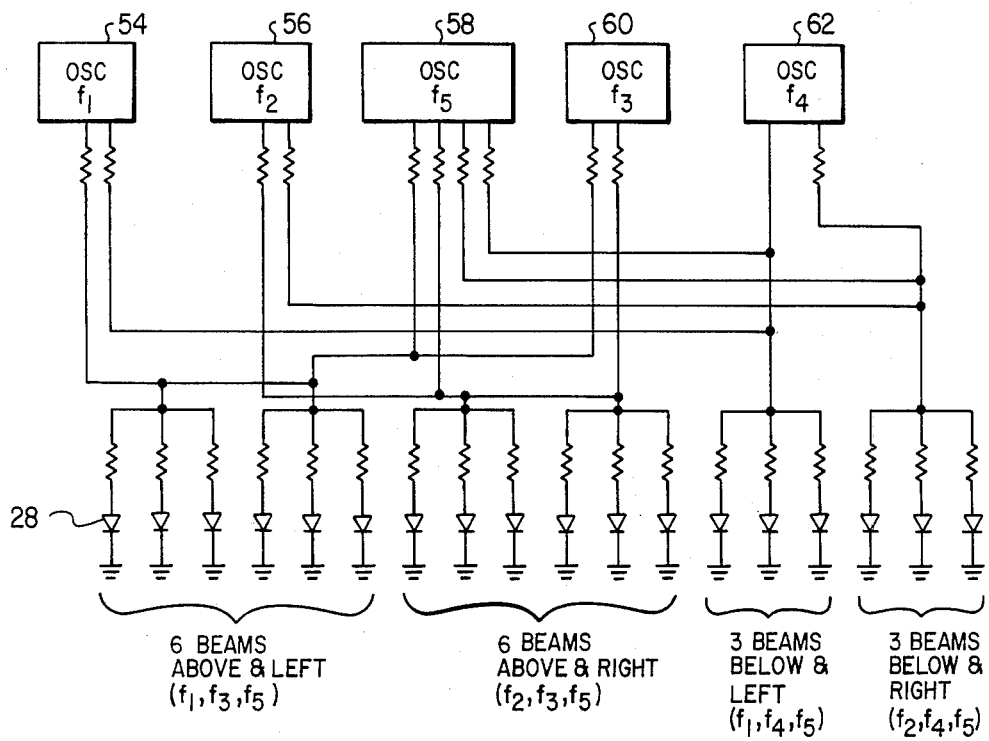
FIG. 12 is schematic of the eighteen modulated reflector configuration of FIG. 11.
Figure 13:
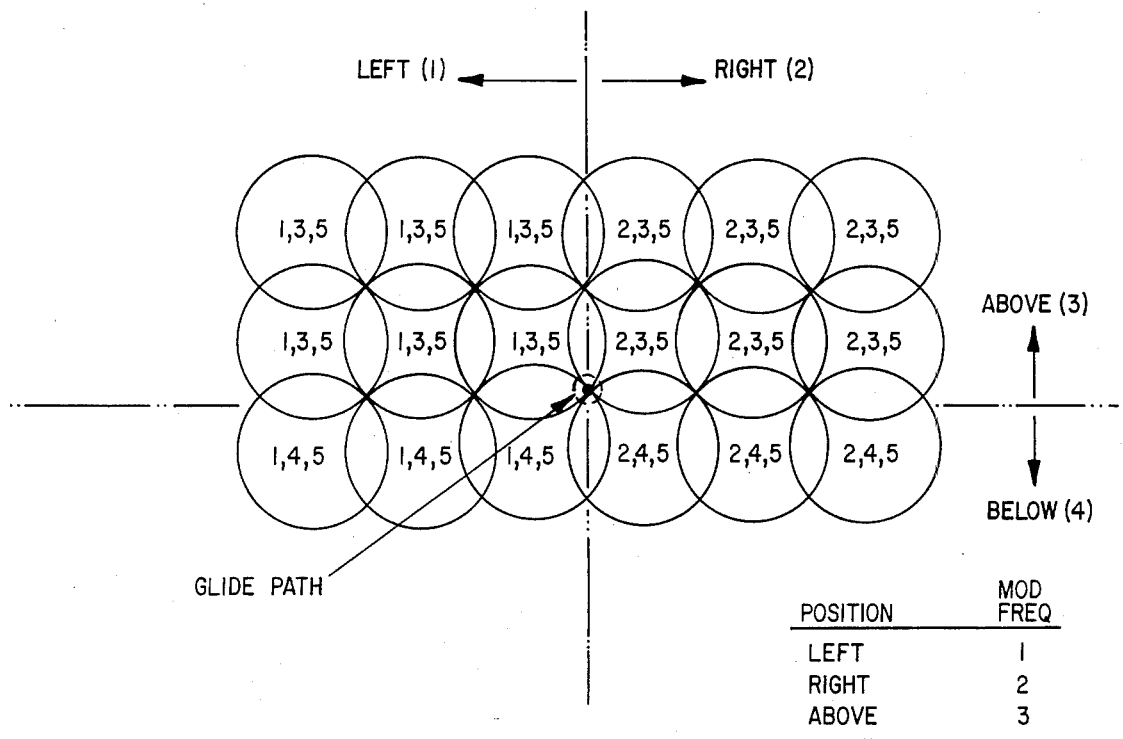
FIG. 13 is a view illustrating the half power footprints and modulating frequency assignments of the eighteen modulated reflector configuration of FIG. 11.

Using the above principles an eighteen modulated reflector configuration, for example, can be fabricated. As shown in rear view (FIG. 11) the Luneberg type lens 10 has 6 columns and 3 rows of reflectors 22. Three columns each are positioned left and right of the vertical center. While one row 48 is positioned below the horizontal center and two rows 50 and 52 are positioned above the horizontal center. The reflectors 22 have their PIN diodes 28 (FIG. 12) connected to five oscillators 54, 56, 58, 60 and 62, having frequencies $f_1$, $f_2$, $f_5$, $f_3$ and $f_4$, respectively, as shown in FIG. 12. The eighteen beam patterns illustrating half power footprints and modulation frequency assignments of FIG. 11 are shown in FIG. 13. As shown in FIG. 13, $f_1$ and $f_2$ indicate left and right of center localizer positions, respectively, and $f_3$ and $f_4$ indicate above and below horizontal glide slope with the intersections of (1,3,5)(2,3,5)(1,4,5) and (2,4,5) indicating the correct glide path.

Figure 14:
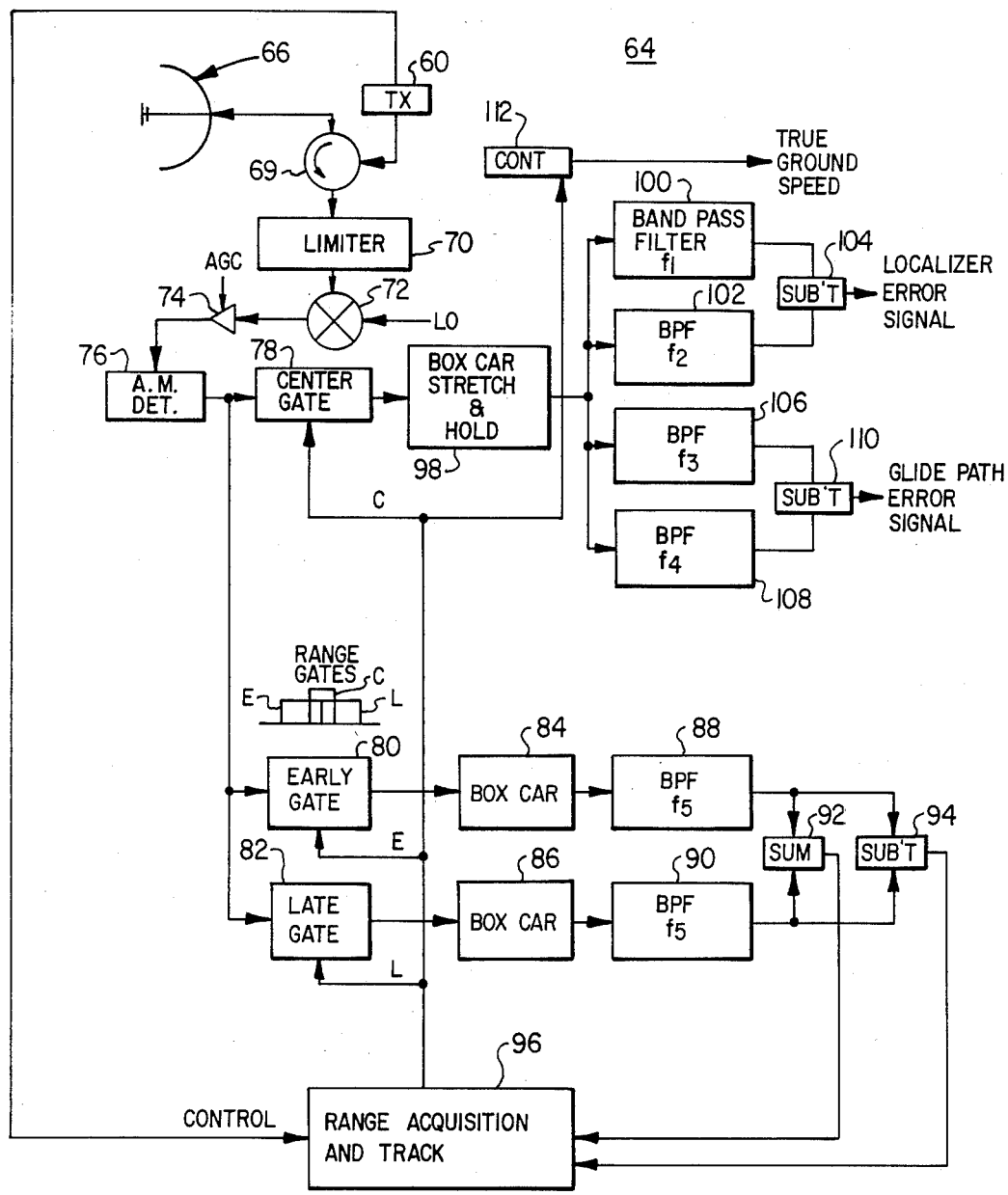
FIG. 14 is a functional black diagram of the airborne receiver.

Referring now to FIG. 14, the airborne interrogator transmitter/receiver 64, includes a reflector or horn antenna 66, and an interrogate transmitter 68 is connected to the antennae 66 through a circulator 69, a limiter 70 is connected to the interrogate transmitter 68 for limiting the incoming RF signals. A mixer 72 is connected to the limiter and to a local oscillator for producing an intermediate frequency (IF). An amplifier 74 with automatic gain control amplifies the IF signal for detection in amplitude modulation detector 76. Range gates, including a center gate 78, early gate 80 and late gate 82, are connected to the A.M. detector 76. Box Car circuits 84 and 86, respectively, are connected to early and late gates 80 and 82. Band pass filters 88 and 90 are connected to the box car circuits 84 and 86, respectively, for passing the $f_5$ frequency signals to a summer (adding) amplifier 92 and a difference (subtracting) amplifier 94 to produce signals for range acquisition and track circuit 96. The output of the range acquisition and track circuit is fed back to the range gates to correct the incoming signals.

A box car, stretch and hold circuit 98 is connected to the center gate and the corrected incoming signals are held for filtering. Band pass filters 100 and 102 pass the $f_1$ and $f_2$ frequencies, respectively, to a difference amplifier (subtractor) 104 to provide a left or right localizer (azimuth) error signal, while band pass filters 106 and 108 pass the $f_3$ and $f_4$ signals to difference amplifier (subtractor) 110 to provide a glide path error signal.

Further a controller 112 or information processor is connected to the interrogator transmitter receiver 64 for receiving clock starting pulses on radar transmit and clock stopping pulses on radar return for computing distance traveled between pulses and deriving true ground speed therefrom along the approach path and a decrease in ground speed is indicative of wind shear conditions between the airborne vehicle and the modulating reflector.

Although several embodiments of the inventions have been described it will be readily apparent to those skilled in the art that modifications can be made thereto without departing from the scope of the invention.

What is claimed is:

1. A radar system for landing aircraft comprising:
  (a) an airborne transmitter/receiver means including a transmitter and receiver, a circulator connected to the transmitter and receiver, and an antenna connected to the circulator for transmitting interrogating signals from the transmitter to a modulating reflector means and for receiving position indicating signals from the modulating reflector means for the receiver;
  (b) a modulating reflector means including a stationary, nonrotating reflector lens means including a lens having a plurality of solid state modulating radar module reflectors arranged in columns and rows for selectively receiving the transmitted interrogating signals, a frequency generator connected to the plurality of modulating radar module reflectors for modulating each reflector with a distinguishing frequency, said plurality of modulating radar module reflectors being operative fo producing beam patterns for half power footprints and modulation frequencies indicative of a landing aircraft's position above and below glide path and left and right of center localizer positions;
  (c) said receiver of the transmitter/receiver means including an amplitude modulated (AM) signal detector for detecting the aircraft position determining signals of the modulating reflector means, range gate means including center, early, and late gates connected tot he AM detector for receiving and detected signals, summing and differencing means connected to the early and late gates for producing sum and different signals for the center frequency, and a range acquisition and track means connected to the sum and differencing means for receiving any sum and difference signals and to the transmitter for receiving time of transmission of the interrogating signals for producing correction signals for the early, late, and center range gate, said range acquisiton and track signals thus including ground speed determining information; a glide path and localizer error producing means and a controller means, said glide path and localizer error producing means being connected to the center gate for producing above or below glide path error signals and left or right localizer error signals, and said controller means connected to the range acquisition and track means and including means for producing true ground speed indicating signals; and
  (d) means responsive to the aircraft position signals and ground speed signals for indicating, respectively, the aircraft's position with respect to the desired glide slope and localizer path, and the ground speed wherein during landing the ground speed indicator provides a landing aircraft information indicating sudden decreases in ground speed indicative of wind sheer ahead.

2. A radar system for landing aircraft according to claim 1 wherein the stationary, nonrotating reflector lens means includes a stationary Luneberg lens.

3. A radar system for landing aircraft according to claim 1 wherein the controller means includes a differentiating circuit.

* * * * *